US011287002B1

(12) United States Patent
Kong et al.

(10) Patent No.: US 11,287,002 B1
(45) Date of Patent: Mar. 29, 2022

(54) ELECTRIC BRAKE ACTUATOR

(71) Applicant: Hyo Seong America Corporation, Farmington Hills, MI (US)

(72) Inventors: Seung Yuel Kong, Blue Ash, OH (US); Changho Lee, Loveland, OH (US)

(73) Assignee: HYO SEONG AMERICA CORPORATION, Farmington Hills, MI (US)

( * ) Notice: Subject to any disclaimer, the term of this patent is extended or adjusted under 35 U.S.C. 154(b) by 0 days.

(21) Appl. No.: 17/132,265

(22) Filed: Dec. 23, 2020

(51) Int. Cl.
| | |
|---|---|
| *F16H 1/46* | (2006.01) |
| *F16D 65/16* | (2006.01) |
| *F16H 55/06* | (2006.01) |
| *F16H 57/02* | (2012.01) |
| *B60T 13/74* | (2006.01) |
| *F16H 57/031* | (2012.01) |
| *F16D 121/24* | (2012.01) |
| *F16D 125/50* | (2012.01) |

(52) U.S. Cl.
CPC ............ *F16D 65/16* (2013.01); *B60T 13/746* (2013.01); *F16H 1/46* (2013.01); *F16H 55/06* (2013.01); *F16H 57/02* (2013.01); *F16H 57/031* (2013.01); *F16D 2121/24* (2013.01); *F16D 2125/50* (2013.01); *F16H 2057/02034* (2013.01); *F16H 2057/02082* (2013.01)

(58) Field of Classification Search
CPC .. F16D 65/16; F16D 2121/24; F16D 2125/50; B60T 13/746; F16H 1/46; F16H 55/06; F16H 57/02; F16H 57/031; F16H 2057/02034; F16H 2057/02082
See application file for complete search history.

(56) References Cited

U.S. PATENT DOCUMENTS

| | | | |
|---|---|---|---|
| 7,721,853 B2 | 5/2010 | Chittka | |
| 2006/0113149 A1* | 6/2006 | Prat | .................. B60T 11/046 |
| | | | 188/2 D |
| 2006/0185472 A1* | 8/2006 | Chiu | ...................... B66F 3/44 |
| | | | 74/640 |

(Continued)

FOREIGN PATENT DOCUMENTS

| | | |
|---|---|---|
| DE | 102006007755 A1 | 8/2007 |
| DE | 202014010361 U1 | 5/2015 |

(Continued)

*Primary Examiner* — David J Hlavka
(74) *Attorney, Agent, or Firm* — Dinsmore & Shohl LLP; Yongsok Choi, Esq.

(57) ABSTRACT

An electric brake actuator includes a housing, a three-stage planetary gear mechanism provided in the housing, the planetary gear mechanism having a first stage, a second stage, and a third stage that are sequentially meshed from one end to the other end of the planetary gear mechanism, and each stage of planetary gear mechanism comprising at least one planet gear, and a planet carrier supporting the planet gear; a motor provided in the housing; and at least one gear connected between the planetary gear mechanism and the motor, the at least one gear being arranged the motor to drive the planetary gear mechanism. The at least one planet gear of the first stage is made of a first material that is different from a second material of which the planet gear of the second stage or the planet gear of the third stage is made.

11 Claims, 4 Drawing Sheets

(56) References Cited

U.S. PATENT DOCUMENTS

| | | | |
|---|---|---|---|
| 2007/0062769 A1* | 3/2007 | Noh | B60T 13/588 |
| | | | 188/265 |
| 2009/0107275 A1* | 4/2009 | Cooper | F16H 55/06 |
| | | | 74/462 |
| 2012/0325601 A1 | 12/2012 | Giering | |
| 2015/0210253 A1* | 7/2015 | Qi | B60T 7/085 |
| | | | 188/162 |

FOREIGN PATENT DOCUMENTS

| | | |
|---|---|---|
| DE | 102014015848 A1 | 4/2016 |
| EP | 2081806 B1 | 8/2010 |
| KR | 1020120048232 A | 5/2012 |
| KR | 1020130082021 A | 7/2013 |
| KR | 1020130143554 A | 12/2013 |
| KR | 1020160130948 A | 11/2016 |

* cited by examiner

ELECTRIC BRAKE ACTUATOR

BACKGROUND

Field

The present disclosure generally relates to an electric brake actuator and in particular, to an electric brake actuator for large vehicles that can generate a higher output torque by using a high planetary gear ratio.

Technical Background

A vehicle has a parking brake system for parking. With the development of technology, the electric parking brake system is replacing the existing manual parking brake and the caliper assembly including an electric motor actuator to operate the caliper and brake pads for parking.

The electric parking brake system usually includes a deceleration transmission mechanism in which the high-speed rotation of the motor is greatly reduced while its torque is increased to provide clamping force.

Conventional deceleration transmission mechanisms include components such as worms, worm wheels, gears and transmission belts. In the end, the planetary gear transmits power to the caliper.

These parking brake systems are applied to sedans and small trucks, but not in large vehicles, such as large trucks. In order to apply into large vehicles, higher actuator output is required. A higher gearbox ratio is required for higher parking forces.

SUMMARY

Accordingly, there is a continual need for electric brake actuator having higher speed reduction ratio for large vehicles. Embodiments of the present disclosure meet this need by electric brake actuator having a three-stage planetary gear mechanism that includes three stages. Each stage of planetary gear mechanism may have at least one planet gear, and a planet carrier supporting the planet gear. The at least one planet gear of the first stage is made of a first material that is different from a second material of which the planet gear of the second stage or the planet gear of the third stage is made.

According to one or more aspects of the present disclosure, an electric brake actuator may comprise a housing, a three-stage planetary gear mechanism provided in the housing, the planetary gear mechanism having a first stage, a second stage, and a third stage that are sequentially meshed from one end to the other end of the planetary gear mechanism, and each stage of planetary gear mechanism comprising at least one planet gear, and a planet carrier supporting the planet gear, a motor provided in the housing, and at least one gear connected between the planetary gear mechanism and the motor, the at least one gear being arranged the motor to drive the planetary gear mechanism, and wherein the at least one planet gear of the first stage is made of a first material that is different from a second material of which the planet gear of the second stage or the planet gear of the third stage is made.

According to one or more other aspects of the present disclosure, an electric brake actuator may comprise a housing, a planetary gear train provided in the housing, the planetary gear train comprises: a three-stage planetary gear mechanism, an output driven by the planetary gear mechanism, a gear housing for receiving the planetary gear mechanism, and a gear cover connected to one end of the gear housing, wherein the planetary gear mechanism having a first stage, a second stage, and a third stage that are sequentially meshed from one end to the other end of the planetary gear train, and each stage of planetary gear mechanism comprises at least one planet gear, and a planet carrier supporting the planet gear, a motor provided in the housing, and at least one gear connected between the planetary gear train and the motor, the at least one gear being arranged the motor to drive the planetary gear train, wherein the at least one planet gear of the first stage is made of a first material that is different from a second material of which the planet gear of the second stage or the planet gear of the third stage is made.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the drawings enclosed herewith.

Reference will now be made in detail to various embodiments, some embodiments of which are illustrated in the accompanying drawings.

DETAILED DESCRIPTION

Embodiments of the present disclosure are directed to electric brake actuators. Electric brake actuators may include electric mechanical brake actuator, electric parking brake actuator, or both. In some embodiments, the electric brake actuator may be included in electromagnetic brake system, frictional brake system, hydraulic brake system, drum brake system, servo brake system, parking and emergency braking system, anti-lock braking system, or combinations thereof.

Referring to FIGS. 1 to 4, an electric brake actuator 10 of the present disclosure may include a housing, a planetary gear train, a motor 120, and at least one gear.

The housing may include a housing cover 200 and a housing body 110 that accommodates the three-stage planetary gear mechanism, the motor 120, and the at least one gear there between. The housing cover 200 may be connected to one end of the housing body 110.

The actuator 10 may further include a mounting bracket 130 and a gear cover 210. The motor 120 may be provided between the mounting bracket 130 and the housing body 110. The motor 120 may be mounted to one side of the mounting bracket 130. The motor 120 may be fastened to the mounting bracket 130 by screws 140. The motor 120 may provide the power necessary to achieve the required brake performance. The motor 120 may convert electrical energy to mechanical energy. The motor 120 may generate a torque to rotate the pinion gear 223.

The gear cover 210 may be connected to the other side of the mounting bracket 130, with the at least one gear being received between the gear cover 210 and the mounting bracket 130. The gear cover 210 may be connected to one end of the gear housing 290.

The at least one gear and the planetary gear train may form a speed reduction mechanism connecting the motor 120 to the output of the actuator 10. The at least one gear may include a final gear 221, an idle gear 222, and a pinion gear 223 that are sequentially meshed. A speed reduction mechanism may reduce the torque from the motor 120. The motor 120 may drive the planetary gear train through the sequentially meshed idle gear 222 and the final gear 221. Power of the motor 120 may be transmitted through the speed reduction mechanism to a parking brake caliper to brake a vehicle.

The pinion gear 223 may be connected to the motor 120. The pinion gear 223 may be fixed to the shaft of the motor 120. The pinion gear 223 may be rotated by a torque generated by the motor 120. The pinion gear 223 may be reduced by the idle gear 222 and the final gear 221 while the torque is increased. The idle gear 222 may be connected to the pinion gear 223. The final gear 221 may be connected to the idle gear 222 and the planetary mechanism. The final gear 221 may include a final gear transmitting force vertically through the planet career of each stage and to the planetary gear mechanism.

Still referring FIGS. 1-4, the actuator 10 may further include a gear housing 290. The gear housing 290 may be mounted to the mounting bracket 130. The gear housing 290 may be connected to the same side of the mounting bracket 130 as the motor 120. The gear housing 290 may be connected to the gear cover 210 such that the gear housing 290 is clamped to the mounting bracket 130 by the gear cover 210. The gear housing 290 may be aligned with the final gear 221 through a hole of mounting bracket 130. The gear housing 290 may receive the planetary gear mechanism.

As stated above, the actuator 10 may include the planetary gear train. The planetary gear train may be provided in the housing. The planetary gear train may include the three-stage planetary gear mechanism, the output 283, the gear housing 290, and the gear cover 210. The three-stage planetary gear mechanism may be mounted in the gear housing 290. The gear housing 290 may be mounted to the mounting bracket 130. The gear housing 290 may be connected to the same side of the mounting bracket 130 as the motor 120. The gear housing 290 may be connected to the gear cover 210 such that the gear housing 290 is clamped to the mounting bracket 130 by the gear cover 210. The gear housing 290 may be aligned with the final gear 221 through a hole of mounting bracket 130.

The planetary gear mechanism may be received in the gear housing 290. The planetary gear mechanism may have a first stage, a second stage, and a third stage that are sequentially meshed from one end to the other end of the planetary gear mechanism.

In one or more embodiments, the three-stage planetary gear mechanism may have an entire gear reduction ratio of between 250:1 and 300:1, 250:1 and 290:1, 250:1 and 280:1, 260:1 and 300:1, 260:1 and 290:1, or 260:1 and 280:1. The gear reduction ratio of the first stage may be relatively smaller than the gear reduction ratio of the second stage and the third stage. For example, the gear reduction ratio of the first stage may be 3:1 whereas the gear reduction ratio of the second stage and the third stage may be 10:1, respectively. Since the gear reduction ratio of the first stage is relatively small, at least one planet gear 230 of the first stage may be made of a material that is different from the material of which the planet gear of 250 the second stage or the planet gear 270 of the third stage is made. The details of the material will be described below.

In one or more embodiments, the three-stage planetary gear mechanism may have an output torque from 30 Newton-metre (Nm) to 100 Nm, from 30 Nm to 80 Nm, from 40 Nm to 100 Nm, from 40 Nm to 80 Nm, from 40 Nm to 60 Nm, or from 40 Nm to 50 Nm. In some embodiments, the three-stage planetary gear mechanism may have an output torque from 38 Nm to 41 Nm, from 43 Nm to 46 Nm, or from 47 Nm to more than 50 Nm. For example, if the output torque from a motor is between 0.22 Nm and 0.24 Nm and the gear reduction ratio is between 250:1 and 300:1, the output torque by the three-stage planetary gear mechanism may be between 40 Nm and 50 Nm given the efficiency of the entire gear mechanism is about 70% at room temperature.

Each stage of planetary gear mechanism may include at least one planet gear, and a planet carrier supporting the planet gear. Each stage of planetary gear mechanism may further include at least one planet pin. The at least one planet pin may be fixed to the planet carrier.

Figure 1:
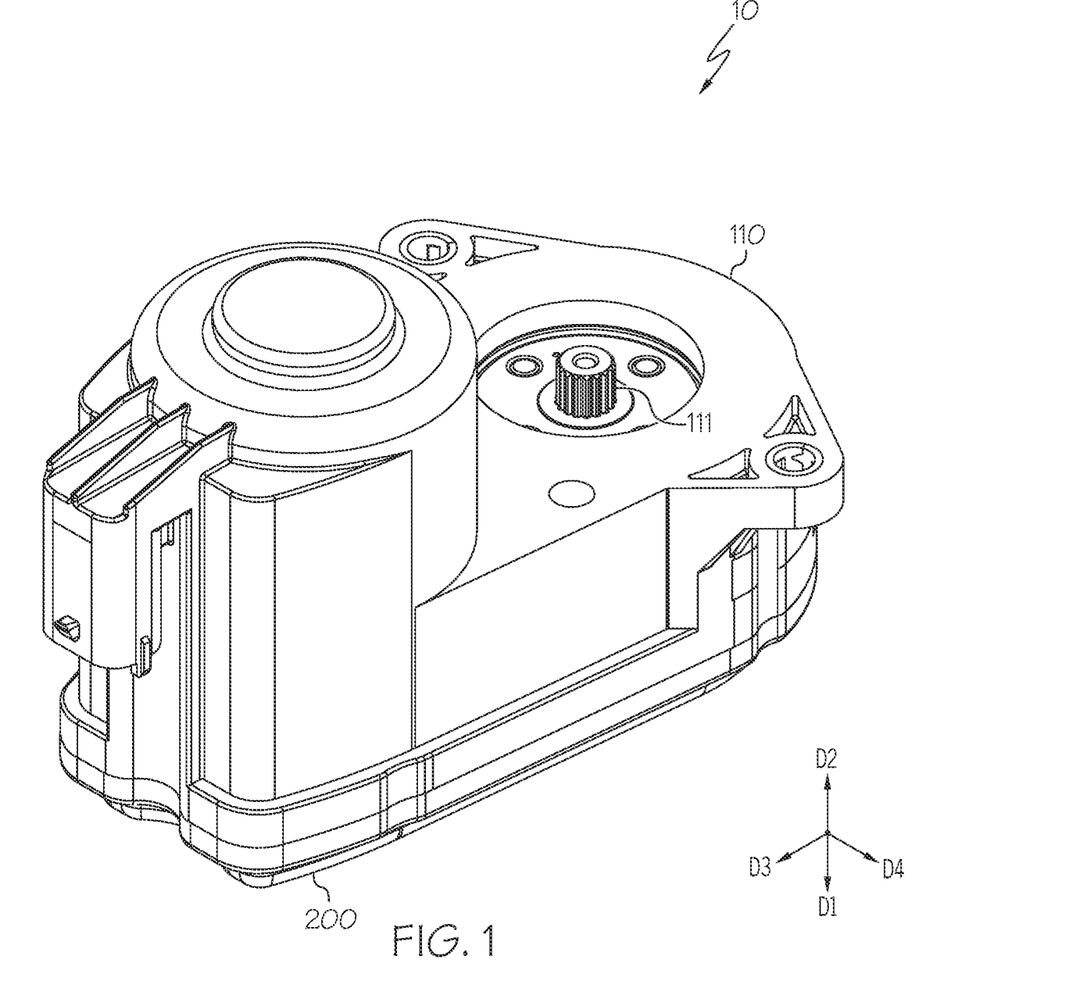
FIG. 1 is an assembled view of an electric brake actuator according to the present disclosure.
Figure 2:
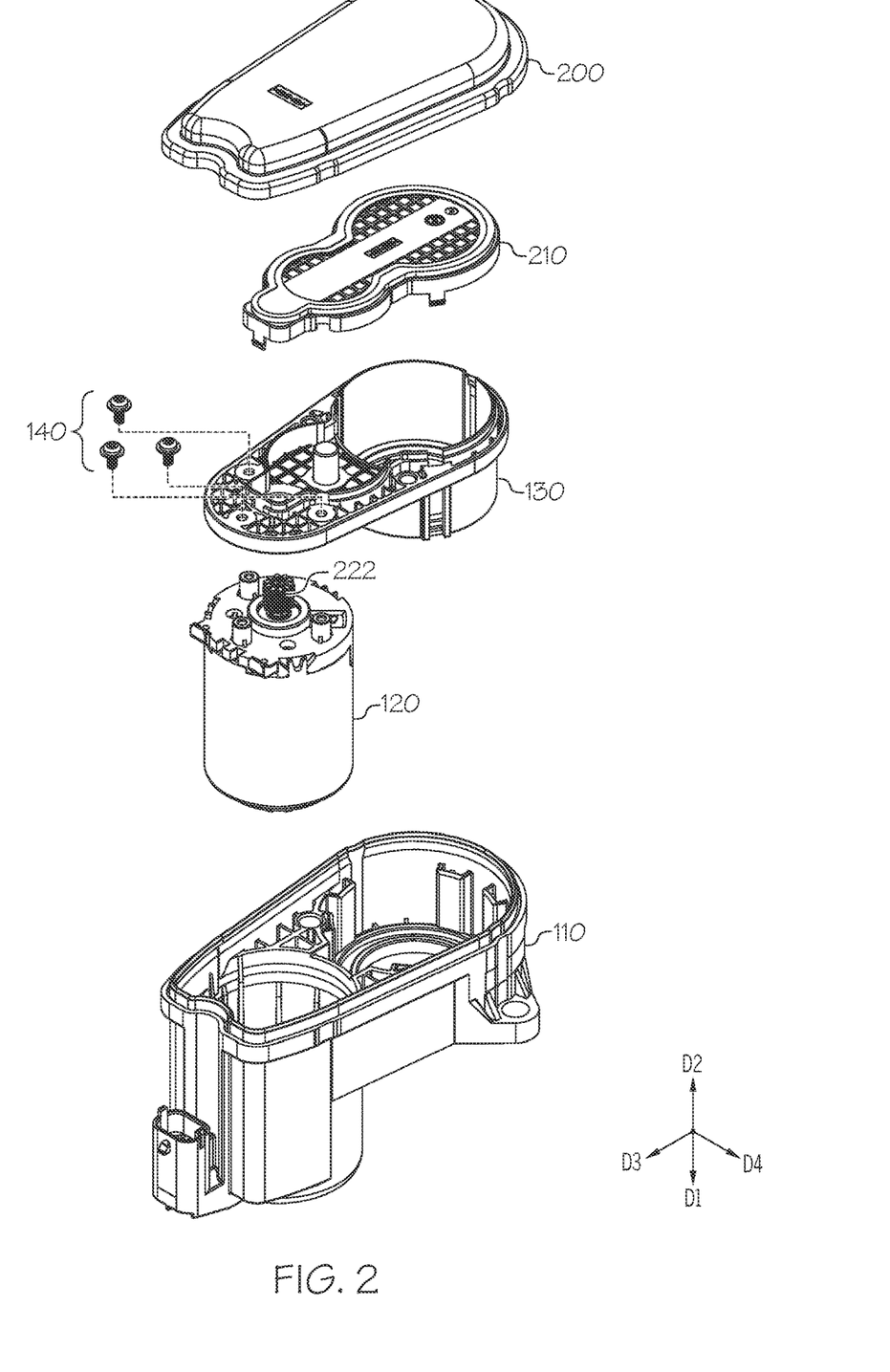
FIG. 2 is an exploded view of the actuator of FIG. 1.
Figure 3:
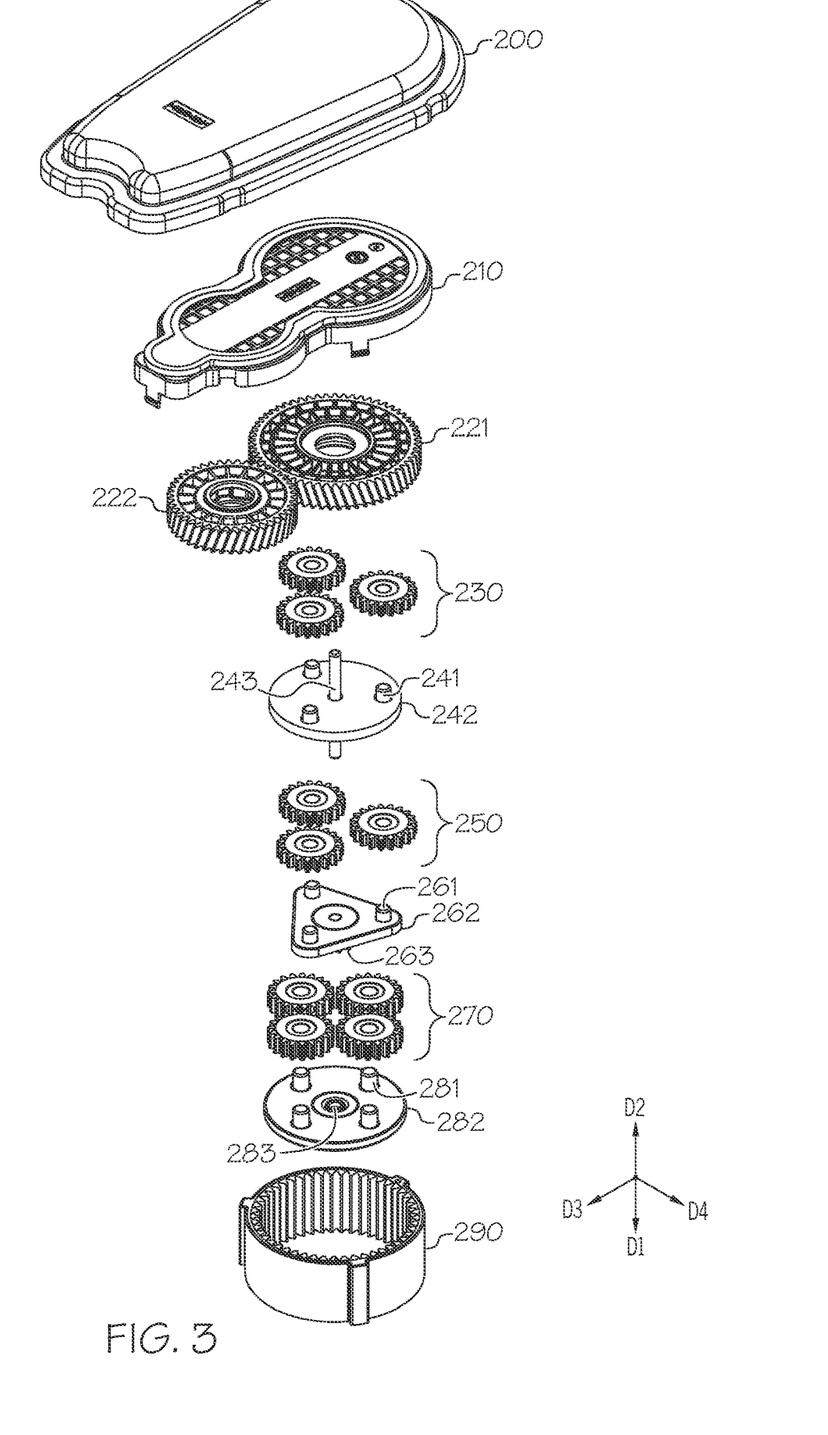
FIG. 3 is an exploded view of the actuator of FIG. 1.
Figure 4:
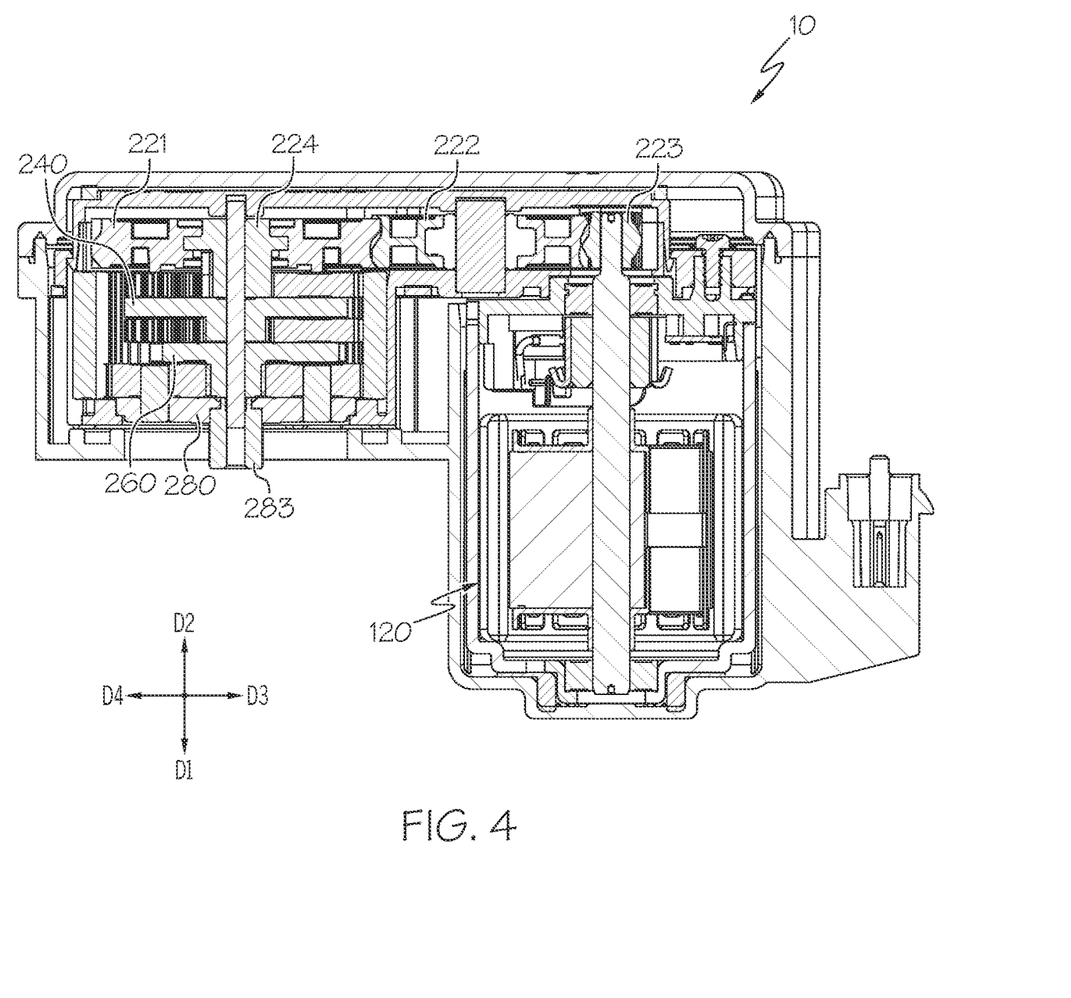
FIG. 4 is a cross-sectional view of the actuator of FIG. 1.

The first stage may include at least one first planet gear 230 and the first planet carrier 242. In some embodiments, the first stage may include three first planet gears 230. The first stage may further include at least one first planet pin 241. In some embodiments, the first stage may include three first planet pins 241. The at least one first planet pin 241 may be fixed to the first planet carrier 242. In some embodiments, the at least one first planet pin 241 may be fixed to the first planet carrier 242 by being inserted into holes therein in an interference fit manner. The first stage may be disposed on the second and third stages.

The at least one planet gear 230 of the first stage may be made of a first material that is different from a second material of which the planet gear of 250 the second stage or the planet gear 270 of the third stage is made. The at least one planet gear 230 of the first stage may include plastic. In some embodiments, the plastic may include polyoxymethylene (POM), polyethylene (PA), polyphthalamide (PPA), Glass Fiber polymer, or combinations thereof. In one or more embodiments, the plastic may include Nylon 66 (PA66), Polyamide 612 (PA612), or both. The at least one planet gear 230 of the first stage may include the plastic, not metal because there are lower loads demand than the at least one planet gear 250 of the second stage and the at least one planet gear 270 of the third stage. The at least one planet gear 230 of the first stage including the plastic may cut weight and noise while providing the strength required to handle higher torque applications, such as large vehicles.

In one or more embodiments, the at least one planet gear 230 of the first stage may include the plastic having from 10 percentage by weight (wt. %) to 45 wt. %, from 10 wt. % to 40 wt. %, from 10 wt. % to 35 wt. %, from 10 wt. % to 30 wt. %, from 15 wt. % to 45 wt. %, from 15 wt. % to 40 wt. %, from 15 wt. % to 35 wt. %, or from 15 wt. % to 30 wt. % of Glass Fiber polymer based on the total weight of the plastic.

In some embodiments, the first planet carrier 242 may be made of plastic that includes polyoxymethylene (POM), polyethylene (PA), polyphthalamide (PPA), Glass Fiber polymer, or combinations thereof. In one or more embodiments, the plastic may include Nylon 66 (PA66), Polyamide 612 (PA612), or both.

In some embodiments, the at least one first planet pin 241 may be made of metal. In one or more embodiments, the metal may include SUJ2.

The second stage may include at least one second planet gear 250 and the second planet carrier 262. In some embodiments, the second stage may include three second planet gears 250. The second stage may further include at least one second planet pin 261. In some embodiments, the second stage may include three second planet pins 261. The at least one second planet pin 261 may be fixed to the second planet carrier 262. In some embodiments, the at least one second planet pin 261 may be fixed to the second planet carrier 262 by being inserted into holes therein in an interference fit manner. The second planet carrier 262 may be connected to the second sun gear 263. The second sun gear 263 may be fixed to the second planet carrier 262 for rotation therewith. The second stage may be disposed between the first and third stages.

The at least one planet gear of the second stage may include metal. In some embodiments, the metal may include SMF5030.

In one or more embodiments, the second planet carrier 262 may be made of metal that includes SMF5030. In some embodiments, the at least one second planet pin 261 may be made of metal that includes SUJ2.

The third stage may include at least one third planet gear 270 and the third planet carrier 282. In some embodiments, the third stage may include four third planet gears 270. The third stage may further include at least one third planet pin 281. In some embodiments, the third stage may include four third planet pins 281. The at least one third planet pin 281 may be fixed to the third planet carrier 282. In some embodiments, the at least one third planet pin 281 may be fixed to the third planet carrier 282 by being inserted into holes therein in an interference fit manner. The third planet carrier 282 may be connected to the output 283. The output 283 may be fixed to the third planet carrier 282 for rotation therewith. The third stage may be disposed between the first and third stages.

The at least one planet gear of the third stage may include metal. In some embodiments, the metal may include SMF5030, SCM415, or both.

In one or more embodiments, the third planet carrier 282 may be made of metal that includes SMF5030, SCM415, or both. In some embodiments, the at least one third planet pin 281 may be made of metal that includes SUJ2.

The actuator 10 may further include a first sun gear 224. The first sun gear 224 may form the input for the planetary gear train. The output 283 may be fixed to the planet carrier 282 of the third stage.

The planetary gear train may further include a centering pin 243. The centering pin 243 may extend through the planetary gear train, such that the multiple stages of planetary gear mechanisms rotate about the centering pin 243. The centering pin 243 may sequentially pass through the first to third stages of planetary gear train. In one or more embodiments, the centering pin 243 may be fixed to the first planet carrier 242. One end of the centering pin may be inserted into the final gear 221 and fixed to the gear cover 210. The other end of the centering pin 243 may be inserted into a guide hole in the second planet carrier 262 and third planet carrier 282, such that the first to third planet carriers 242, 262, 282 rotate about the centering pin 243.

A first aspect of the present disclosure may be directed to an electric brake actuator comprising: a housing, a three-stage planetary gear mechanism provided in the housing, the planetary gear mechanism having a first stage, a second stage, and a third stage that are sequentially meshed from one end to the other end of the planetary gear mechanism, and each stage of planetary gear mechanism comprising at least one planet gear, and a planet carrier supporting the planet gear, a motor provided in the housing, and at least one gear connected between the planetary gear mechanism and the motor, the at least one gear being arranged the motor to drive the planetary gear mechanism, and wherein the at least one planet gear of the first stage is made of a first material that is different from a second material of which the planet gear of the second stage or the planet gear of the third stage is made.

A second aspect of the present disclosure may include the first aspect, wherein the at least one planet gear of the first stage includes plastic.

A third aspect of the present disclosure may include either one of the first or second aspects, wherein the plastic includes polyoxymethylene (POM), polyethylene (PA), polyphthalamide (PPA), Glass Fiber polymer, or combinations thereof.

A fourth aspect of the present disclosure may include any one of the first through third aspects, wherein the at least one planet gear of the first stage includes plastic, and the at least one planet gear of the second and third stages include metal.

A fifth aspect of the present disclosure may include any one of the first through fourth aspects, wherein the at least one planet gear of the first stage comprises three planet gears, the at least one planet gear of the second stage comprises three planet gears, and the at least one planet gear of the third stage comprises four planet gears.

A sixth aspect of the present disclosure may include any one of the first through fifth aspects, wherein the planetary gear mechanism further comprises a centering pin extending through the planetary gear mechanism, such that stages of the planetary gear mechanism rotate about the centering pin.

A seventh aspect of the present disclosure may include any one of the first through sixth aspects, wherein the at least one gear comprises: a pinion gear connected to the motor, and rotated by a torque generated by the motor; an idle gear connected to the pinion gear; and a final gear connected to the pinion gear and the planetary gear mechanism, the final gear comprises a final gear transmitting force vertically through the planet career of each stage and to the planetary gear mechanism.

An eighth aspect of the present disclosure may include any one of the first through seventh aspects, wherein the pinion gear is reduced by the idle gear and the final gear while the torque is increased.

A ninth aspect of the present disclosure may include any one of the first through eighth aspects, further comprising a gear housing for receiving the planetary gear mechanism.

A tenth aspect of the present disclosure may include any one of the first through ninth aspects, further comprising: a gearbox cover connected to one end of the gear housing; and a housing cover connected to one end of the housing.

An eleventh aspect of the present disclosure may include any one of the first through tenth aspects, wherein an entire gear reduction ratio of the three-stage planetary gear mechanism is between 250:1 and 300:1.

A twelfth aspect of the present disclosure may be directed to an electric brake actuator comprising: a housing, a planetary gear train provided in the housing, the planetary gear train comprises: a three-stage planetary gear mechanism, an output driven by the planetary gear mechanism, a gear housing for receiving the planetary gear mechanism, and a gear cover connected to one end of the gear housing, wherein the planetary gear mechanism having a first stage, a second stage, and a third stage that are sequentially meshed from one end to the other end of the planetary gear train, and each stage of planetary gear mechanism comprises at least one planet gear, and a planet carrier supporting the planet gear, a motor provided in the housing, and at least one gear connected between the planetary gear train and the motor, the at least one gear being arranged the motor to drive the planetary gear train, wherein the at least one planet gear of the first stage is made of a first material that is different from a second material of which the planet gear of the second stage or the planet gear of the third stage is made.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. An electric brake actuator comprising:
    a housing;
    a three-stage planetary gear mechanism provided in the housing, the planetary gear mechanism having a first stage, a second stage, and a third stage that are sequentially meshed from one end to the other end of the planetary gear mechanism, and each stage of planetary gear mechanism comprising at least one planet gear, and a planet carrier supporting the planet gear;
    a motor provided in the housing; and
    a plurality of gears connected between the planetary gear mechanism and the motor, the motor driving the planetary gear mechanism via the plurality gears,
    wherein the at least one planet gear of the first stage is made of a first material that is different from a second material of which the planet gear of the second stage or the planet gear of the third stage is made, and
    wherein the at least one planet gear of the first stage comprises three planet gears, the at least one planet gear of the second stage comprises three planet gears, and the at least one planet gear of the third stage comprises four planet gears.

2. The electric brake actuator of claim 1, wherein the at least one planet gear of the first stage includes plastic.

3. The electric brake actuator of claim 2, wherein the plastic includes polyoxymethylene (POM), polyethylene (PA), polyphthalamide (PPA), Glass Fiber polymer, or combinations thereof.

4. The electric brake actuator of claim 1, wherein the at least one planet gear of the first stage includes plastic, and the at least one planet gear of the second and third stages include metal.

5. The electric brake actuator of claim 1, wherein the planetary gear mechanism further comprises a centering pin extending through the planetary gear mechanism, such that stages of the planetary gear mechanism rotate about the centering pin.

6. The electric brake actuator of claim 1, wherein the plurality of gears comprise:
    a pinion gear connected to the motor, and rotated by a torque generated by the motor;
    an idle gear connected to the pinion gear; and
    a final gear connected to the pinion gear and the planetary gear mechanism, the final gear comprises a final gear transmitting force vertically through the planet career of each stage and to the planetary gear mechanism.

7. The electric brake actuator of claim 6, wherein the pinion gear is reduced by the idle gear and the final gear while the torque is increased.

8. The electric brake actuator of claim 1, further comprising a gear housing for receiving the planetary gear mechanism.

9. The electric brake actuator of claim 8, further comprising:
    a gear cover connected to one end of the gear housing; and
    wherein the housing comprises:
    a housing body; and
    a housing cover connected to one end of the housing body.

10. The electric brake actuator of claim 1, wherein an entire gear reduction ratio of the three-stage planetary gear mechanism is between 250:1 and 300:1.

11. An electric brake actuator comprising:
    a housing;
    a planetary gear train provided in the housing, the planetary gear train comprises:
    a three-stage planetary gear mechanism;

an output driven by the planetary gear mechanism;
a gear housing for receiving the planetary gear mechanism; and
a gear cover connected to one end of the gear housing,
wherein the planetary gear mechanism having a first stage, a second stage, and a third stage that are sequentially meshed from one end to the other end of the planetary gear train, and each stage of planetary gear mechanism comprises at least one planet gear, and a planet carrier supporting the planet gear;
a motor provided in the housing; and
a plurality of gears connected between the planetary gear train and the motor, the motor driving the planetary gear train via the plurality of gears,
wherein the at least one planet gear of the first stage is made of a first material that is different from a second material of which the planet gear of the second stage or the planet gear of the third stage is made, and
wherein an entire gear reduction ratio of the three-stage planetary gear mechanism is between 250:1 and 300:1.

* * * * *